(12) United States Patent
Ting et al.

(10) Patent No.: US 8,093,855 B2
(45) Date of Patent: Jan. 10, 2012

(54) LOW SPEED CONTROL METHOD AND APPARATUS FOR SERVO MOTOR

(75) Inventors: Chia-Min Ting, Taoyuan County (TW); Hsin-Hung Chou, Changhua County (TW); Chiu-Pao Tien, Hsinchu County (TW); Cheng-Min Chang, Keelung (TW); Ya-Ling Chang, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 314 days.

(21) Appl. No.: 12/536,012

(22) Filed: Aug. 5, 2009

(65) Prior Publication Data

US 2010/0156336 A1    Jun. 24, 2010

(30) Foreign Application Priority Data

Dec. 24, 2008  (TW) ............................... 97150384 A (51) Int. Cl.
*G05B 11/42*    (2006.01)

(52) U.S. Cl. .............. 318/610; 318/568.15; 318/568.18; 318/602; 318/400.4

(58) Field of Classification Search .................. 318/610, 318/568.15, 568.18, 602, 400.4
See application file for complete search history.

(56) References Cited

U.S. PATENT DOCUMENTS

| 4,583,033 A | 4/1986 | Uehara et al. |
| 4,588,936 A | 5/1986 | Itoh et al. |
| 4,621,224 A | 11/1986 | Watabe et al. |
| 4,623,831 A | 11/1986 | Sakamoto et al. |
| 4,882,529 A | 11/1989 | Kobari et al. |
| 4,892,103 A | 1/1990 | Ogasawara |
| 4,963,808 A | 10/1990 | Torisawa et al. |
| 5,003,238 A | 3/1991 | Lum et al. |
| 5,625,310 A | 4/1997 | Takeishi |
| 5,744,926 A * | 4/1998 | Lai et al. ........................ 318/590 |
| 6,037,735 A * | 3/2000 | Janosky et al. ............... 318/608 |
| 6,556,131 B1 | 4/2003 | Besharat et al. |

FOREIGN PATENT DOCUMENTS

| JP | 674787 | 3/1994 |
| JP | 2000148249 A | 5/2000 |
| JP | 2008122264 A | 5/2008 |
| JP | 2008130035 A | 6/2008 |

* cited by examiner

*Primary Examiner* — Walter Benson
*Assistant Examiner* — Erick Glass
(74) *Attorney, Agent, or Firm* — Morris Manning & Martin LLP; Tim Tingkang Xia, Esq.

(57) ABSTRACT

A low speed control method and an apparatus for a servo motor. The control apparatus comprises: an encoder capable of acquiring a speed signal from a servo motor and encoding the speed signal to output a low-resolution encoded signal; an insertion calculation unit capable of receiving the low-resolution encoded signal from the encoder to be processed by an interpolation operation for converting the low-resolution encoded signal into a high-resolution encoded signal to be outputted therefrom; a servo control chip capable of setting internal parameters and receiving the high-resolution encoded signal from the insertion calculation unit to be processed by a calculation process so as to output a switch control instruction; and a power module capable of receiving the switch control instruction from the servo control chip and then transmitting the same to the servo motor for adjusting the operation speed of the servo motor.

11 Claims, 8 Drawing Sheets

LOW SPEED CONTROL METHOD AND APPARATUS FOR SERVO MOTOR

FIELD OF THE INVENTION

The present invention generally relates to a low speed control method and an apparatus for a servo motor and, more particularly, to a low speed control method and an apparatus using a servo chip and an encoder to output a high-resolution encoded signal by interpolation so that low speed control is achieved.

BACKGROUND OF THE INVENTION

With the advancement in technologies, servo motor control has played an important role in both traditional and high-tech industries. As the chip design techniques have been improved, it is a trend to develop servo motor control towards high precision. To implement high-precision control, the standard for the servo control chip performance as well as the encoder resolution is high. However, the commercially available servo control chips and encoders may not be satisfactory, which leads to higher cost if application specific ICs (ASIC) are required. Therefore, to reduce the cost, the existing servo control chip and encoder can be used with a method capable of improving the driving capability of the servo control chip. Such a method has to be compatible with the interface of the existing servo control chip and capable of enhance the resolution of the encoder. Moreover, the method has to be resistant to the environmental noise or capable of de-noising because the servo driver is often installed in a place more severe than in a general labrotory.

The low-resolution communication format for an encoder is the parallel communication, while the high-resolution communication format is the serial communication using a different pin count. Moreover, the commercially available servo control chip sold with the encoder only supports the parallel communication. Therefore, the commercially available servo control chip does not provide the pin count to support the high-resolution serial communication. Accordingly, the performance of the servo driver is limited by the resolution of the encoder. Even though the commercially available servo control chip can be used to achieve high-precision control, it still fails to meet the specifications of the high-performance of a servo driver. If the commercially available servo control chip is required to support the data receiving from the high-resolution encoder, a specially designed servo control chip is required to increase the cost. If the specially designed servo control chip is not used, the servo control chip of the servo driver has to support the communication format and pin design of the high-resolution encoder, which leads to higher cost.

Generally, a deceleration mechanism is used to achieve low speed output if the high-resolution encoder is not used. With the use of the deceleration mechanism, the overall size of the servo motor mechanism will be significantly enlarged to increase the cost and shorten the lifetime of the deceleration mechanism. Accordingly, the mechanism has to be fixed and/or replaced regularly to increase the cost. Moreover, with the use of the deceleration mechanism, the shifting from high to low gears may not be smooth. Therefore, economical benefit appears if high speed/control ratio is achieved without using the deceleration mechanism; and significant economical benefit appears if high speed/control ratio is achieved by the use of the low-resolution encoder.

Figure 1:
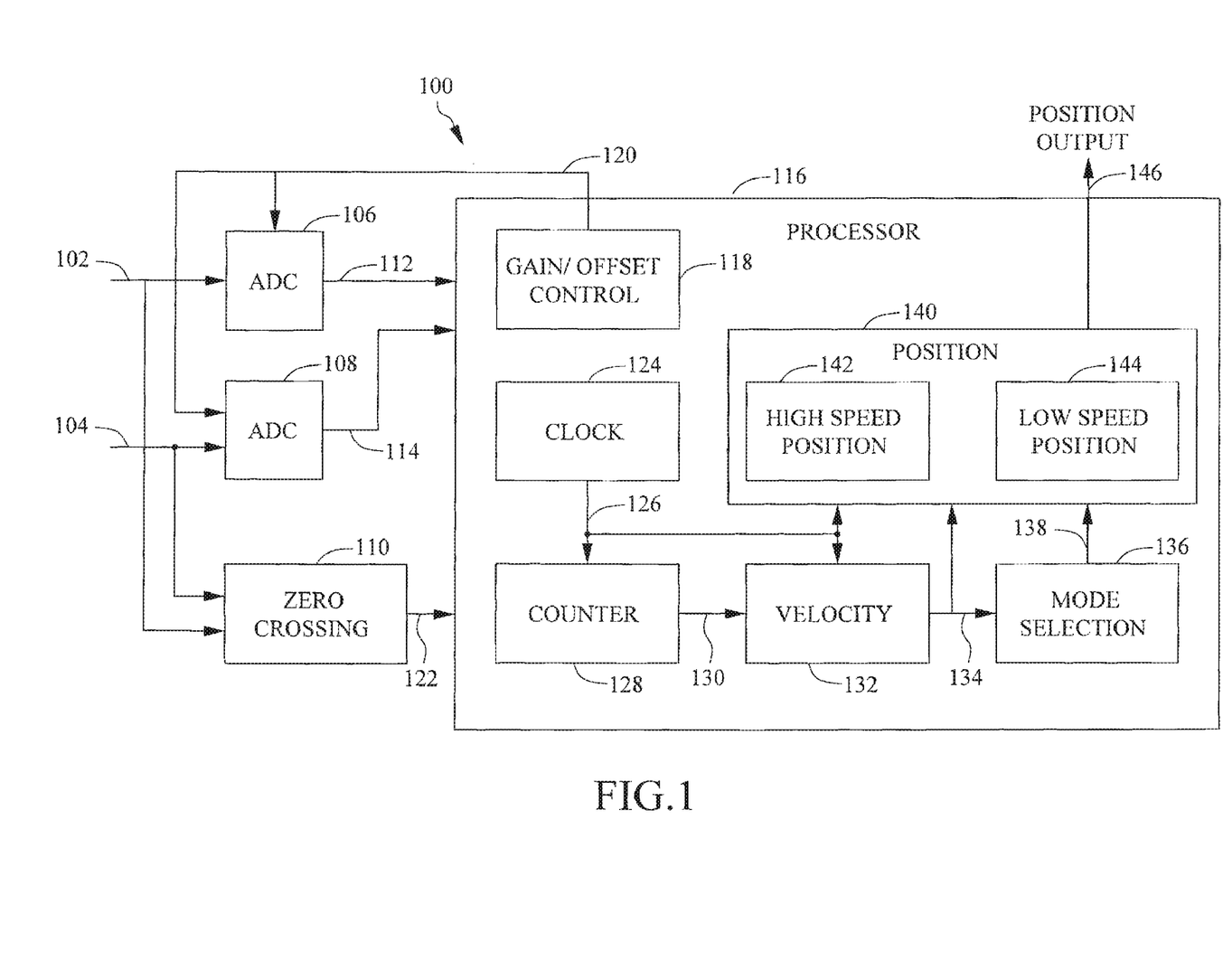
FIG. 1 shows a schematic diagram of a conventional low speed control structure of a servo motor.

Please refer to U.S. Pat. No. 6,556,131, which shows a schematic diagram of a conventional low speed control structure of a servo motor. The output signal from the position senser of the servo motor is sinusoidal, which is processed by an analog-to-digital converter (ADC) chip to output the position of the servo motor. U.S. Pat. No. 6,556,131 uses the output data from the ADC chip to calculate the position of the servo motor by comparing with the look-up table according to the speed of the servo motor. The encoder resolution is not fixed but determined according to the number of the processing speed of the processor and the number of processed bits.

In the present invention, the commercially available encoder is used. The resolution is increased by the method of the present invention to transmit data to the servo control chip. The present invention is similar to the prior art in that the resolution of the servo motor position is improved. However, in the prior art, the sinusoidal signal from the position senser of the servo motor is processed by an analog-to-digital converter (ADC) chip. The resolution of the servo motor depends on the number of bits of the ADC chip and the number of bits of the encoder.

SUMMARY OF THE INVENTION

In view of the above, the present invention provides a low speed control method and an apparatus using a servo chip and an encoder to output a high-resolution encoded signal by interpolation so that low speed control is achieved.

The present invention further provides a low speed control method and an apparatus using signal processing to enhance the resolution of an encoder to achieve high-precision control. Accordingly, better signal quality is realized under high-noise data transmission conditions of an encoder at a low speed without being affected or mis-transmitted to achieve high precision and a wide speed control range.

In one embodiment, the present invention provides a low speed control apparatus for a servo motor, the low speed control apparatus comprising: a servo motor; an encoder capable of acquiring a speed signal from a servo motor and encoding the speed signal to output a low-resolution encoded signal; an insertion calculation unit capable of receiving the low-resolution encoded signal from the encoder to be processed by an interpolation operation for converting the low-resolution encoded signal into a high-resolution encoded signal to be outputted therefrom; a servo control chip capable of setting internal parameters and receiving the high-resolution encoded signal from the insertion calculation unit to be processed by a calculation process so as to output a switch control instruction; and a power module capable of receiving the switch control instruction from the servo control chip and then transmitting the same to the servo motor for adjusting the operation speed of the servo motor.

BRIEF DESCRIPTION OF THE DRAWINGS

The objects and spirits of the embodiments of the present invention will be readily understood by the accompanying drawings and detailed descriptions, wherein.

DETAILED DESCRIPTION OF THE PREFERRED EMBODIMENT

The present invention can be exemplified by but not limited to various embodiments as described hereinafter.

The present invention provides a structure capable of supporting the commercially available encoder interface of a servo control chip. A general encoder can be used to improve low speed control precision. Moreover, a high-resolution encoder can further be used to improve the high-resolution encoder performances without being limited by the encoder resolution. Therefore, the resolution of encoder is flexible without using any deceleration mechanism. The present invention has advantages such as low cost, small size, high extension and utility. The currently available servo control chip can be used to improve the performance of the servo motor driver with the method for enhancing the encoder resolution.

Figure 2:
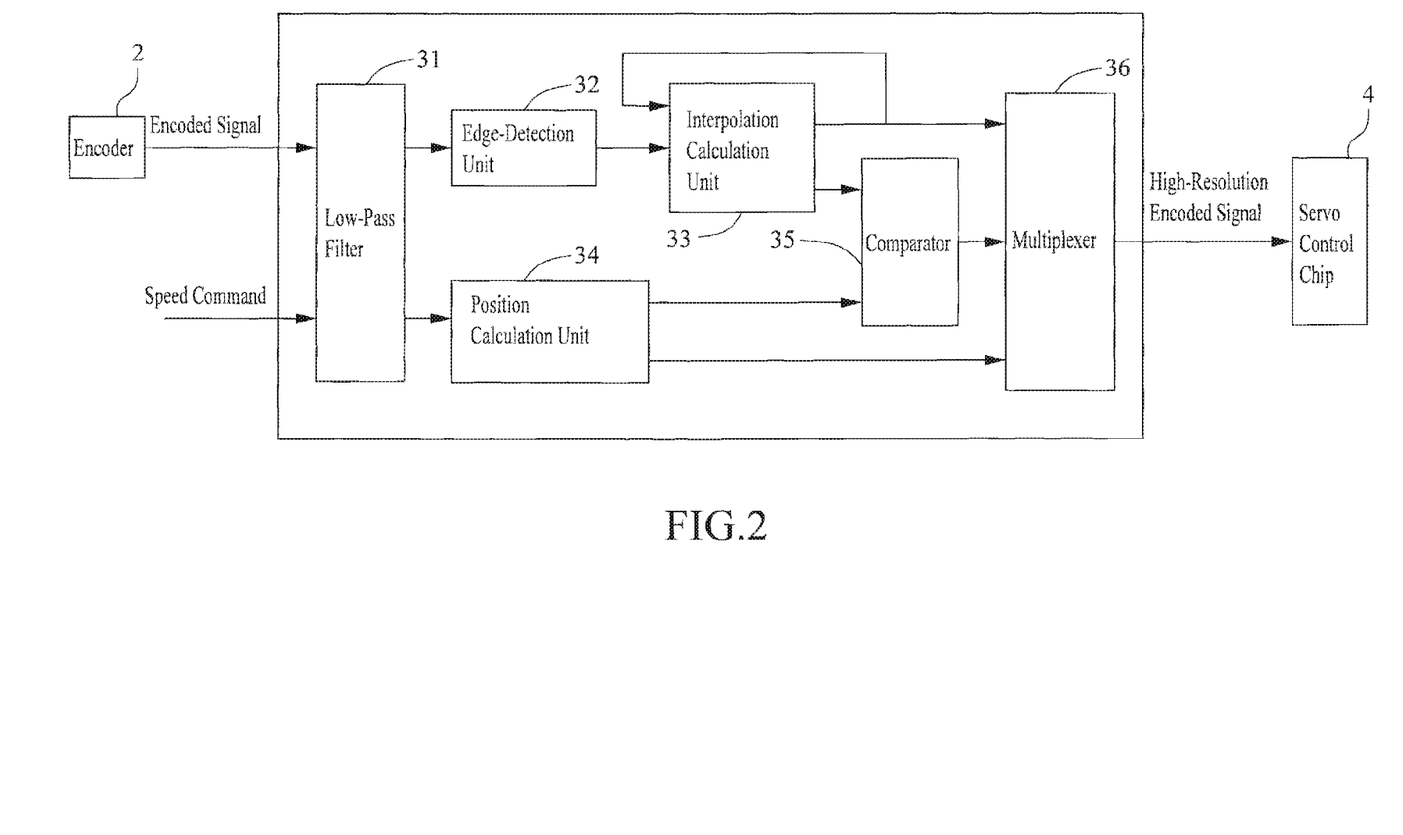
FIG. 2 is a schematic diagram of an insertion calculation unit according to the present invention.
Figure 3:
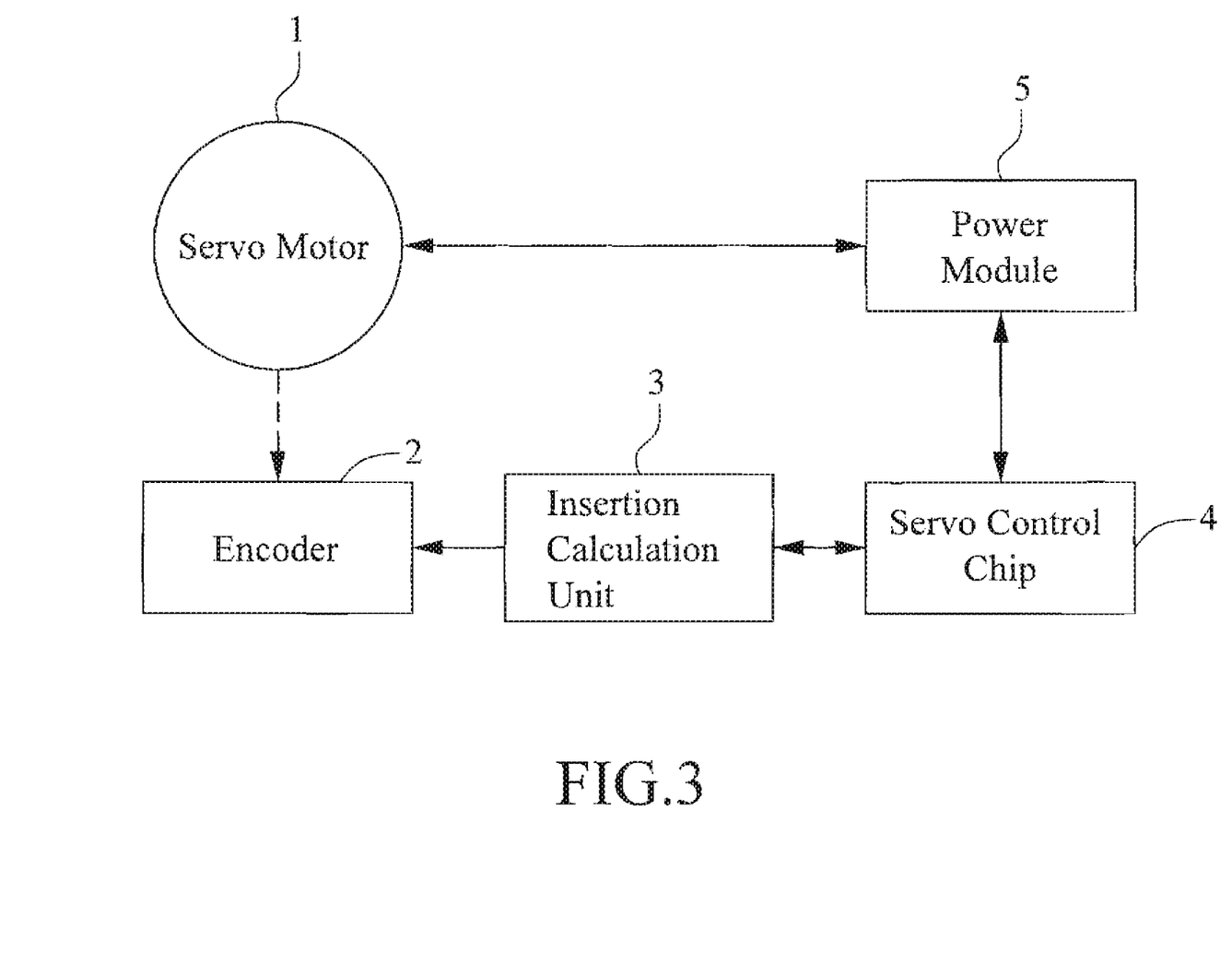
FIG. 3 is a schematic diagram of a low speed control apparatus for a servo motor according to the present invention.

Please refer to FIG. 2 and FIG. 3. FIG. 2 is a schematic diagram of an insertion calculation unit according to the present invention; and FIG. 3 is a schematic diagram of a low speed control apparatus for a servo motor according to the present invention. The low speed control apparatus comprises: a servo motor 1; an encoder 2; an insertion calculation unit 3; a servo control chip 4; and a power module 5. The encoder 2 is capable of acquiring a speed signal from a servo motor and encoding the speed signal to output a low-resolution encoded signal after an encoding process. The encoder output signal is a square wave signal. The square wave signal can be a differential signal or a single-ended signal. The format of the output low-resolution encoded signal from the encoder 2 is parallel. The insertion calculation unit 3 comprises: a low-pass filter 31, an edge-detection unit 32, an interpolation calculation unit 33, a position calculation unit 34, a comparator 35 and a multiplexer 36. The insertion calculation unit 3 is capable of receiving the low-resolution encoded signal from the encoder 2 to be processed by an interpolation operation for converting the low-resolution encoded signal into a high-resolution encoded signal to be outputted therefrom. The interpolation algothism of the insertion calculation unit 3 is to increase the number of square waves of the input signal from the encoder and transmit the signal into the servo control chip 4, wherein the resolution is enhanced by setting internal parameters using the servo control chip 4. In the interpolation algorithm, the number of the square waves is calculated according to the final resolution inside the servo control chip 4 and the current resolution of the encoder 2, while the square wave signal is output after the output frequency is calculated according to the speed and the speed command of the servo motor 1. The servo control chip 4 is capable of setting internal parameters and receiving the high-resolution encoded signal from the insertion calculation unit 3 to be processed by a calculation process so as to output a switch control instruction. Moreover, the servo control chip 4 is also capable of de-noising and transferring the encoder differential signal into the single-ended signal. The power module 5 is capable of receiving the switch control instruction from the servo control chip 4 and then transmitting the same to the servo motor 1 for adjusting the operation speed of the servo motor 1.

There are two connecting interfaces for the servo control chip 4 and there are two corresponding communication interfaces for the encoder 2. One is parallel digital communication, which is capable of transmitting interpolation position data to the servo control chip 4; and the other is incremental parallel communication, which is capable of transferring interpolation position data to square waves and transmitting the same to the servo control chip 4. After the signal is calculated by the encoder 2, it is transmitted to the servo control chip 4. The format of the encoder 2 is transferred into the square wave format of the servo control chip 4. The insertion calculation unit 3 uses a programmable logic chip (such as a FPGA) with a low-pass filter 31 (LPF) inside to de-noise. Signal processing is performed in the edge-detection unit 32, the interpolation calculation unit 33, the position calculation unit 34, the comparator 35 and the multiplexer 36 to output a high-resolution encoded signal to the servo control chip 1.

Figure 4:
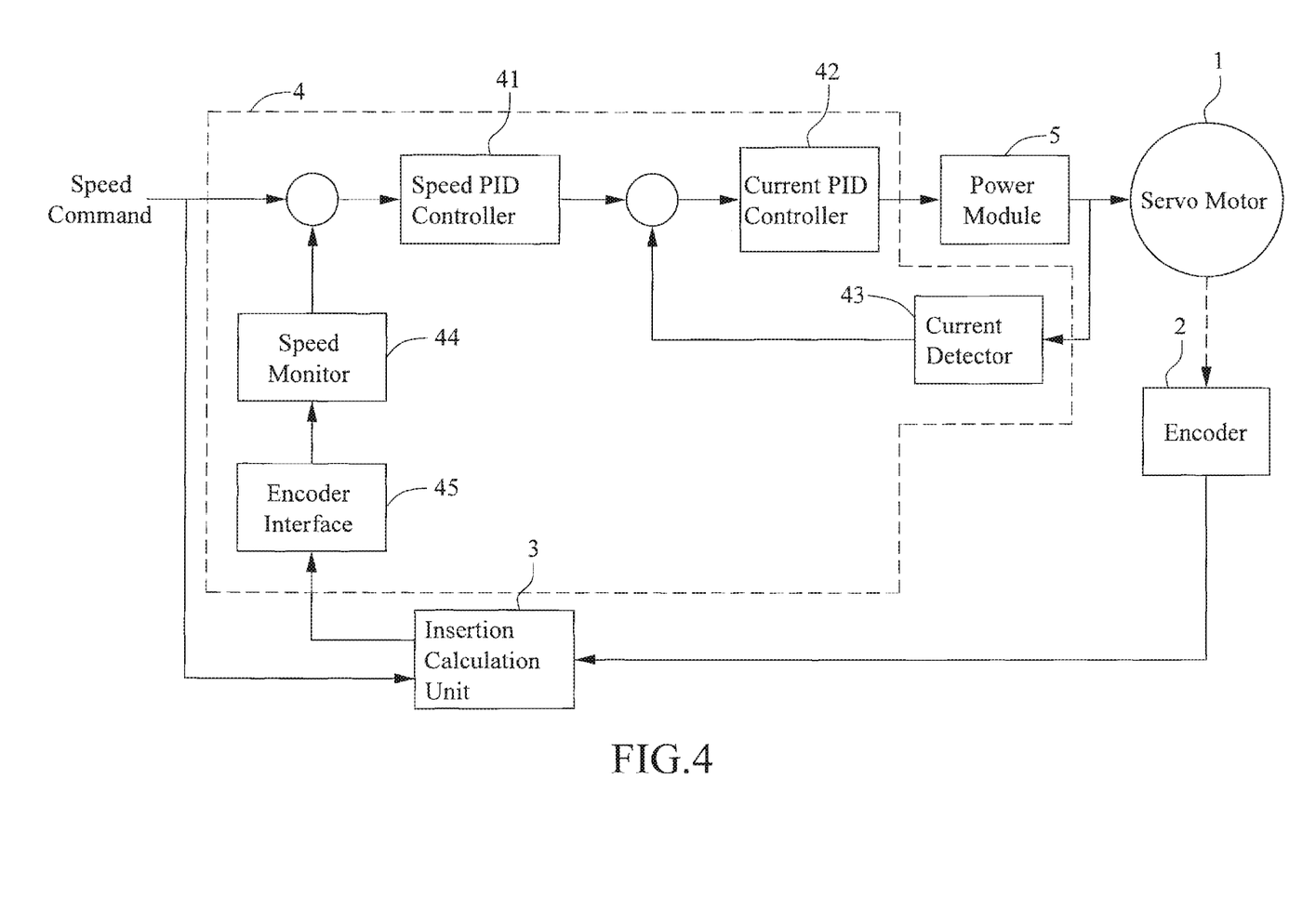
FIG. 4 is a more detailed circuit diagram of FIG. 3.

Please refer to FIG. 4, which is a more detailed circuit of FIG. 3. The servo control chip 4 comprises: a speed PID controller 41, a current PID controller 42, a current detector 43, a speed monitor 44 and an encoder interface 45. The insertion calculation unit 3 also provides the function of the encoder interface 45 of the servo control chip 4 so that the method for enhancing the resolution in the present invention is unlimited by the input interface of the encoder 2 and the servo control chip 4. It provides more flexibility in choosing the servo control chip 4. Accordingly, the present invention has advantages such as:

(1) enhanced encoder resolution;
(2) capability in de-noising under high noise conditions;
(3) capability in operation with respect to various encoder interfaces without being limited to the type of the servo control chip; and
(4) achievement in low speed control by providing better encoded data.

Figure 5:
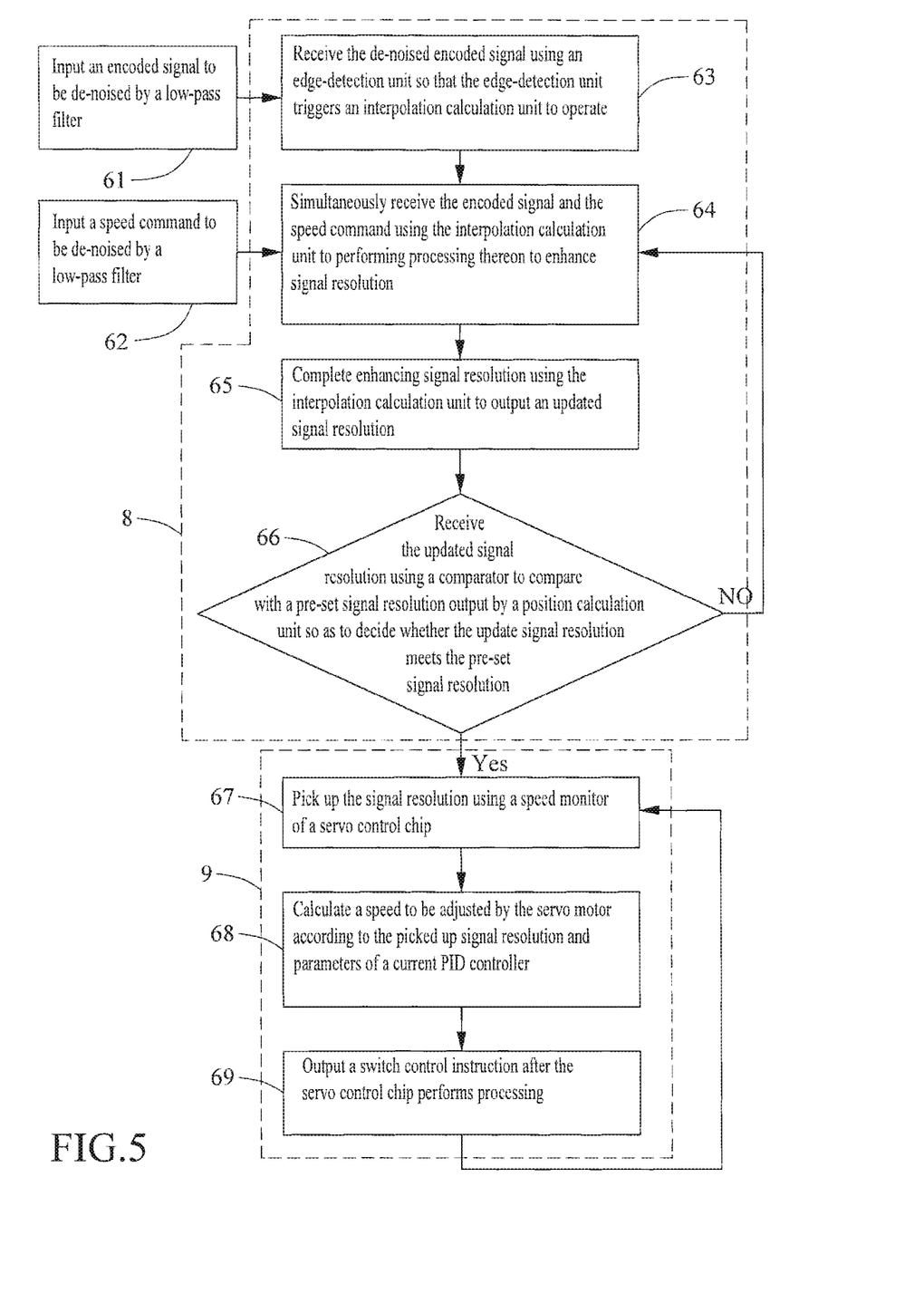
FIG. 5 is a flowchart of a low speed control method for a servo motor according to the present invention.

Please refer to FIG. 5, which is a flowchart of a low speed control method for a servo motor according to the present invention. With reference to FIG. 2 and FIG. 4, the method comprises steps of:

In step 61, an encoded signal is input to be de-noised by a low-pass filter.

In step 62, a speed command is input to be de-noised by a low-pass filter.

In step 63, an edge-detection unit receives the de-noised encoded signal so that the edge-detection unit triggers an interpolation calculation unit to operate. The encoded signal is a square wave signal, and edge detection is for detecting the high level and the low level.

In step 64, the interpolation calculation unit receives the encoded signal and the speed command simultaneously to perform processing thereon to enhance signal resolution.

In step 65, the interpolation calculation unit completes enhancing signal resolution to output an updated signal resolution.

In step 66, a comparator receives the updated signal resolution from the interpolation calculation unit to compare with a pre-set signal resolution output by a position calculation unit so as to decide whether the update signal resolution meets the pre-set signal resolution. A multiplexer is used to output the signal resolution if the updated signal resolution from the interpolation calculation unit meets the pre-set signal resolution from the position calculation unit. Otherwise, the interpolation calculation unit keeps performing processing to enhance the signal resolution if the updated signal resolution from the interpolation calculation unit does not meet the pre-set signal resolution from the position calculation unit.

In step 67, the signal resolution is picked up using a speed monitor of a servo control chip.

In step 68, a speed to be adjusted by the servo motor is calculated by the speed PID controller of the servo control chip according to the picked up signal resolution and parameters of a current PID controller.

In step 69, the servo control chip outputs a switch control instruction calculation after the servo control chip performs processing.

The steps 63 to 66 are performed by the insertion calculation unit 8, while the steps 67 to 69 are performed by the servo control chip 9. By the use of the insertion calculation unit 8 and the servo control chip 9, the rotation rate of the servo motor can be precisely controlled.

The return time indicates the time spent during each operation. Conventionally, during low-speed operation, the position data received by the servo control chip during each return time does not change while the output data that controls the algorithm changes significantly if an encoder is used. With the method in FIG. 5, the interpolated data is transmitted to the servo control chip 9 and thus the calculated data according to the algorithm does change while the variation during the controlling process is smaller. In step 63, once the triggering edge when receiving the encoded signal is changed, the interpolation process is performed to calculate an updated position according to the speed command and motor speed. As long as the interpolation condition is met, the updated position is output to the servo control chip so that the servo control chip is capable of controlling the speed according to the position.

Figure 6:
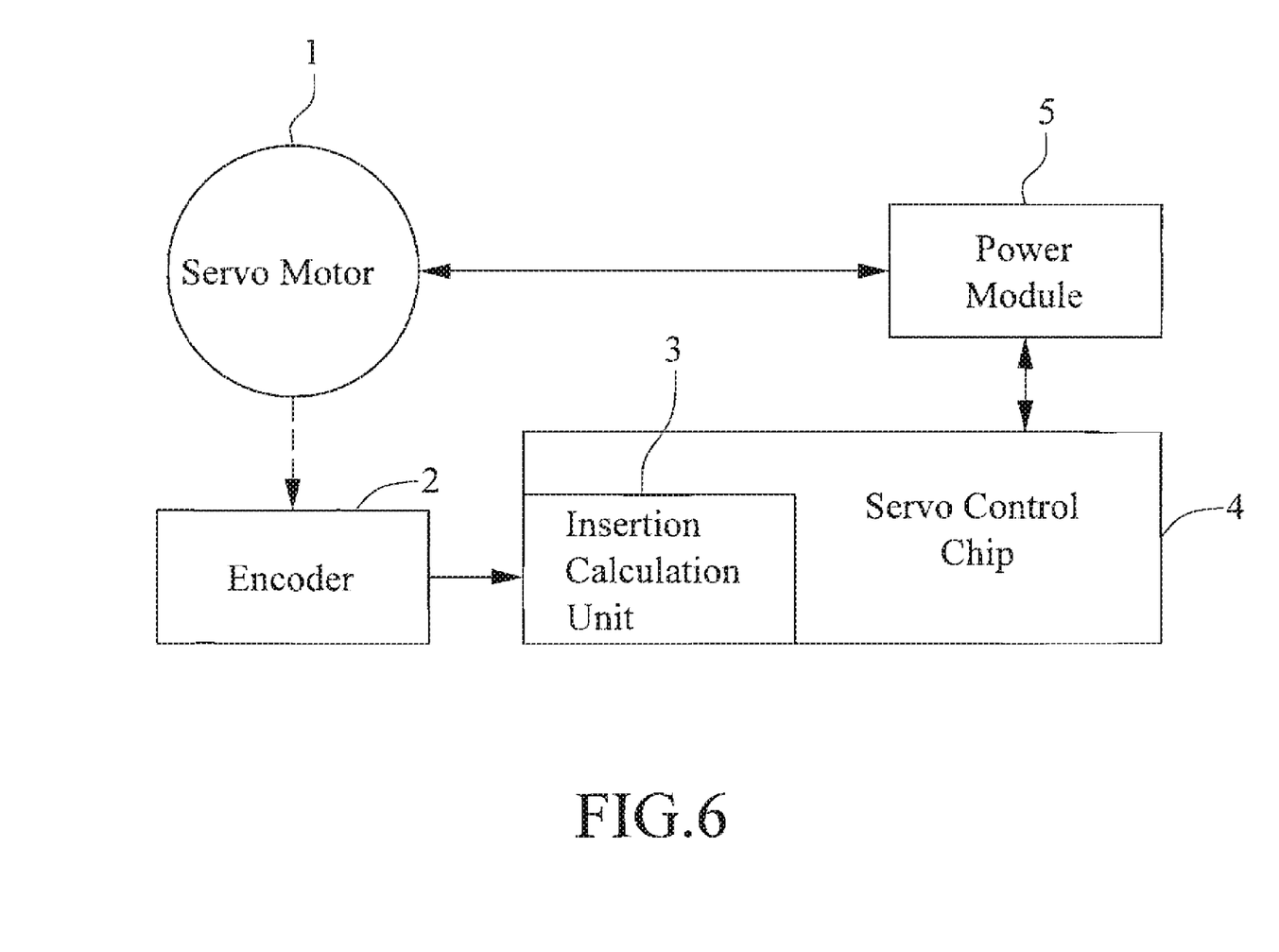
FIG. 6 is a schematic diagram of another low speed control apparatus for a servo motor according to the present invention.

Please refer to FIG. 6, is a schematic diagram of another low speed control apparatus for a servo motor according to the present invention. FIG. 6 is similar to FIG. 3 except that the insertion calculation unit 3 is embedded in the servo control chip 4 so as to implement the hardware for performing the operation can be embedded in the servo control chip to improve the functionality of the servo control chip 4.

Figure 7:
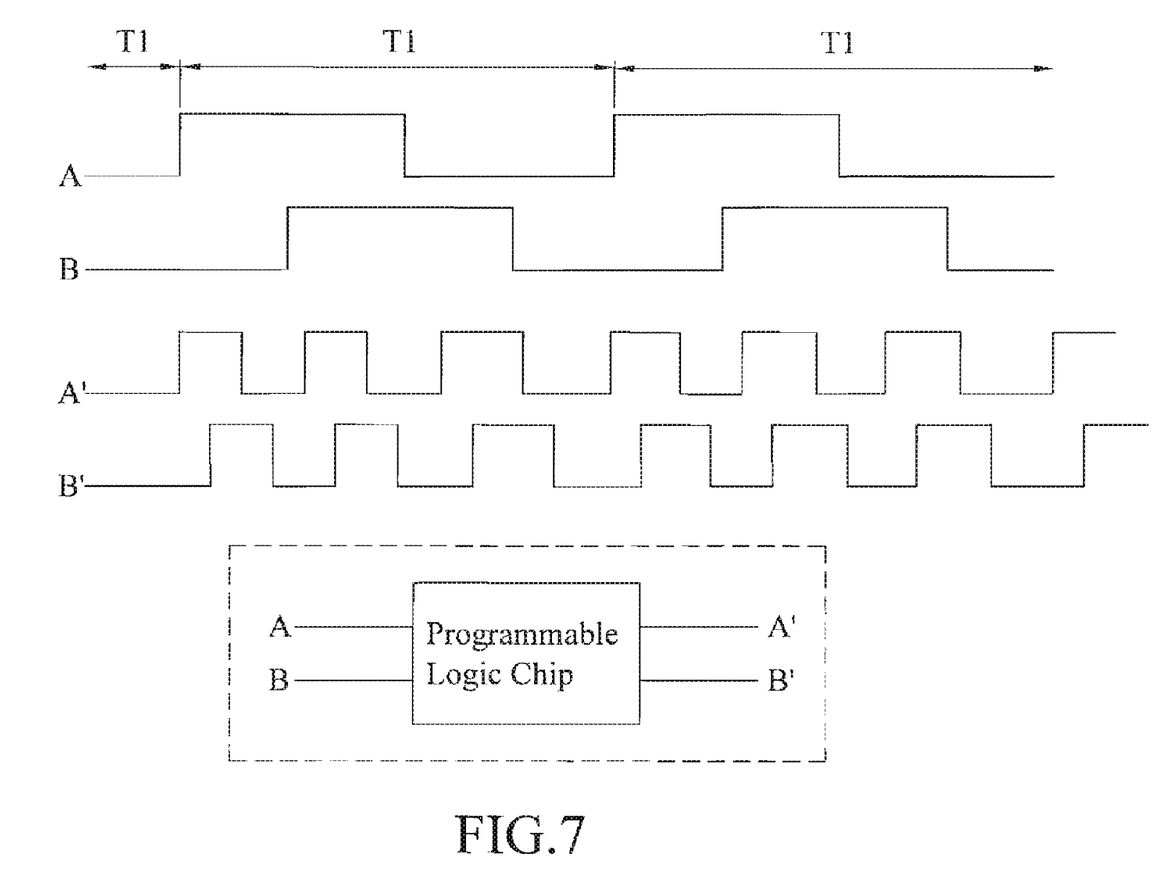
FIG. 7 is a timing diagram of an output signal processed by an insertion calculation unit.

Please refer to FIG. 7, which is a timing diagram of an output signal processed by an insertion calculation unit. The encoded square wave signal is processed to become a high-resolution encoded signal and is input into the servo control chip. T1 denotes the cycle of an encoded signal A, while A' and B' are processed encoded signals to be output to the servo control chip. In FIG. 7, the resolution of the processed signal is twice the resolution of the unprocessed signal. For example, if the unprocessed signal is expressed as 1000 pulses per round of the servo motor, the processed signal is 3000 pulses per round of the servo motor.

Figure 8:
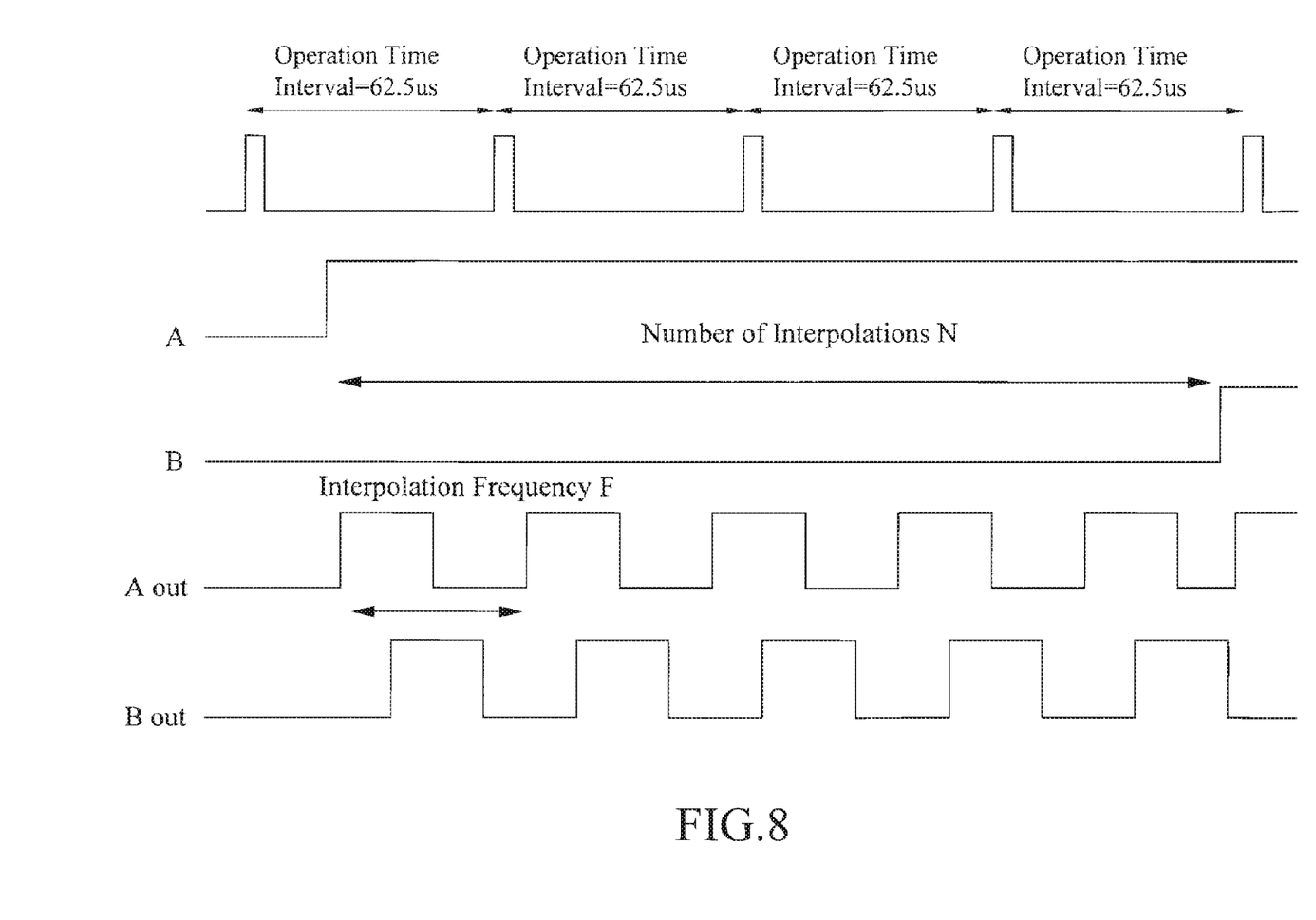
FIG. 8 is a timing diagram of an output signal processed by an insertion calculation unit when an incremental encoder is used.

Please refer to FIG. 8, which is a timing diagram of an output signal processed by an insertion calculation unit when an incremental encoder is used. If the output signal of the present invention is an incremental encoded output square wave signal, the output resolution has to be decided because the number and the frequency of the output square waves have to be decided. The algorithm will be described hereinafter. After the number and the frequency of the output square waves are decided, the interpolation process is performed according to the flowchart in FIG. 5 after the encoded data is triggered so as to output the square wave signal if the interpolation condition is met.

Interpolation algorithm:
Output digital data format:

$$\text{Updated position} = \text{current position} + (\text{speed command} \times \text{highest speed by interpolation})/\text{highest speed}$$

Output square waves format:

$$\text{Number of interpolations } N = \text{desired resolution/current resolution}$$

$$\text{Command freq} = (N \times \text{current speed command} \times \text{highest freq})/\text{highest speed}$$

$$\text{Motor freq} = (N \times \text{current motor speed} \times \text{highest freq})/\text{highest speed}$$

Interpolation condition:
Output digital data format:

$$(\text{speed command} \times \text{highest speed by interpolation})/\text{highest speed} < \text{digital data per calibration}$$

Output square waves format:

$$\text{Number of output square waves} < \text{Number of interpolations } N$$

The interpolation formula and interpolation conditions are stated above. Since there are two different output formats of data output to the servo control chip, the corresponding calculation methods are different. When the output is digital position data, the calculation method is performed according to the speed command and the interpolation resolution to determine updated the position data. The interpolation condition is that the calculated updated position value cannot exceed the original encoded position data. When the servo motor is rotating at a low speed, the original encoded position data does not change during the return time. When the interpolation process is to be performed, the interpolated value has to be within a calibration range of the original encoded signal so as to prevent position errors. If the output data is incremental encoded square wave data, the interpolation condition is that the number and frequency of received interpolated square waves do not exceed a pre-set resolution range. To ensure the number of square waves received by the servo control chip equals the pre-set resolution within one turn of the servo motor, the algorithm for calculating the interpolation frequency is based on the servo motor speed and the speed command.

There are two approaches for data communication in the servo control chip of the present invention. One is encoder-format square waves and the other is parallel communication. Generally, the servo control chip provides the encoded signal with square wave communication interfaces. The parallel communication interface is provided by the servo control chip to transmit other data. Therefore, if the user needs to access the data inside the chip, parallel communication can be used to communicate with the chip.

The present invention provides a hardware configuration corresponding to the flowchart in FIG. 5 to determine the speed and external input data. Therefore, a register is required to load the data. Since it is required to calculate the cycle and perform other mathematic operations, a logic and mathematic calculation unit is provided to complete corresponding calculations and determinations. Moreover, a de-noising operation is also required. An encoded signal generating module is required to provide various servo chips with encoded signals. To control the output signal, a processing interface is required. Accordingly, to achieve the foregoing objects of the present invention and generate high-resolution encoded signal, the hardware configuration comprises: a logic and mathematic calculation logic unit, a register, an encoded signal generating unit and a processing interface. The register stores the parameters of the chip and the output data from the encoder. The servo control chip communicates with the chip and transmits the data and parameters to the chip, and vice versa, using the communication format compatible with the servo control chip.

According to the above discussion, it is apparent that the present invention discloses a low speed control method and an apparatus using a servo chip and an encoder to output a high-resolution encoded signal by interpolation so that low speed control is achieved.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A low speed control apparatus for a servo motor, the low speed control apparatus comprising:
   the servo motor;
   an encoder, acquiring a speed signal from a servo motor and encoding the speed signal to output a low-resolution encoded signal;
   an insertion calculation unit, receiving the low-resolution encoded signal from the encoder to be processed by an interpolation operation for converting the low-resolution encoded signal into a high-resolution encoded signal to be outputted therefrom;
   a servo control chip, setting internal parameters and receiving the high-resolution encoded signal from the insertion calculation unit to be processed by a calculation process so as to output a switch control instruction; and
   a power module, receiving the switch control instruction from the servo control chip and then transmitting the same to the servo motor for adjusting the operation speed of the servo motor,
   wherein a numerical analysis in interpolation by the insertion calculation unit is to increase the number of square waves of a signal inputted by the encoder and transmit the signal to the servo control chip and the resolution is enhanced by setting internal parameters in the servo control chip; and
   wherein the interpolation algorithm is to calculate the number of square waves for each interpolation operation according to final resolution parameters in the servo control chip and current resolution parameters in the encoder, and to output the square waves after output frequency is calculated according to current servo motor speed and the speed command.

2. The low speed control apparatus as recited in claim 1, wherein the encoder outputs a square wave signal being a differential signal.

3. The low speed control apparatus as recited in claim 1, wherein the servo control chip is capable of de-noising.

4. The low speed control apparatus as recited in claim 1, wherein the low-resolution encoded signal outputted by the encoder is in a parallel output format.

5. The low speed control apparatus as recited in claim 1, wherein the servo control chip comprises: a speed PID controller, a current PID controller, a current detector, a speed monitor and an encoder interface.

6. The low speed control apparatus as recited in claim 1, wherein the insertion calculation unit comprises: a low-pass filter, an edge-detection unit, an interpolation calculation unit, a position calculation unit, a comparator and a multiplexer.

7. The low speed control apparatus as recited in claim 1, wherein the insertion calculation unit is disposed in the servo control chip.

8. The low speed control apparatus as recited in claim 1, wherein the insertion calculation unit is a programmable logic chip and comprises at least a low-pass filter disposed therein.

9. A low speed control method for a servo motor, the method comprising steps of:
   inputting an encoded signal to be de-noised by a low-pass filter;
   inputting a speed command to be de-noised by a low-pass filter;
   receiving the de-noised encoded signal using an edge-detection unit so that the edge-detection unit triggers an interpolation calculation unit to operate;
   simultaneously receiving the encoded signal and the speed command using the interpolation calculation unit to performing processing thereon to enhance signal resolution;
   completing enhancing signal resolution using the interpolation calculation unit to output an updated signal resolution;
   receiving the updated signal resolution using a comparator to compare with a pre-set signal resolution output by a position calculation unit so as to decide whether the update signal resolution meets the pre-set signal resolution;
   picking up the signal resolution using a speed monitor of a servo control chip;
   using a speed PID controller of the servo control chip to calculate a speed to be adjusted by the servo motor according to the picked up signal resolution and parameters of a current PID controller; and
   outputting a switch control instruction after the servo control chip performs processing.

10. The low speed control method as recited in claim 9, wherein the encoded signal is a square wave signal.

11. The low speed control method as recited in claim 9, wherein the comparator receives the updated signal resolution from the interpolation calculation unit and the pre-set signal resolution from a position calculation unit and compares the updated signal resolution and the pre-set signal resolution to decide whether the updated signal resolution from the interpolation calculation unit meets the pre-set signal resolution, wherein a multiplexer is used to output the signal resolution if the updated signal resolution from the interpolation calculation unit meets the pre-set signal resolution from the position calculation unit or the interpolation calculation unit keeps performing processing to enhance the signal resolution if the updated signal resolution from the interpolation calculation unit does not meet the pre-set signal resolution from the position calculation unit.

* * * * *